United States Patent
Hong et al.

(10) Patent No.: US 10,715,002 B2
(45) Date of Patent: Jul. 14, 2020

(54) AMMONIA-RESISTANT MOTOR USED FOR CLOSED-TYPE REFRIGERATING COMPRESSOR

(71) Applicant: Suzhou Better Technology Co., Ltd., Suzhou, Jiangsu (CN)

(72) Inventors: MaoQin Hong, Suzhou (CN); ZeNong Cai, Suzhou (CN); ZhiMin Zhuang, Suzhou (CN); HaiYang Du, Suzhou (CN); Hao Yu, Suzhou (CN)

(73) Assignee: Suzhou Better Technology Co., Ltd. (CN)

( * ) Notice: Subject to any disclaimer, the term of this patent is extended or adjusted under 35 U.S.C. 154(b) by 105 days.

(21) Appl. No.: 15/747,033

(22) PCT Filed: Oct. 13, 2017

(86) PCT No.: PCT/CN2017/105963
§ 371 (c)(1),
(2) Date: Jan. 23, 2018

(87) PCT Pub. No.: WO2019/028998
PCT Pub. Date: Feb. 14, 2019

(65) Prior Publication Data
US 2019/0222086 A1      Jul. 18, 2019

(30) Foreign Application Priority Data

Aug. 10, 2017  (CN) .......................... 2017 1 0680375
Oct. 13, 2017  (WO) ....................... PCT/2017/105963

(51) Int. Cl.
H02K 15/12      (2006.01)
H02K 3/50       (2006.01)
(Continued)

(52) U.S. Cl.
CPC ............. *H02K 3/50* (2013.01); *F25B 49/025* (2013.01); *H02K 3/30* (2013.01); *H02K 3/34* (2013.01);
(Continued)

(58) Field of Classification Search
CPC . H02K 3/50; H02K 3/44; H02K 11/25; H02K 2203/06; H02K 3/30; H02K 3/34;
(Continued)

(56) References Cited

U.S. PATENT DOCUMENTS 4,755,114 A  *  7/1988  Shibayashi ........ B01D 46/0039
                                                418/55.6
5,688,433 A  *  11/1997  Kasahara ............. C10M 107/34
                                                252/67
(Continued)

FOREIGN PATENT DOCUMENTS

EP            0729214 A2 *  8/1996   .............. H02K 3/44

*Primary Examiner* — Thanh Lam

(57) ABSTRACT

An ammonia-resistant motor used for a closed-type refrigerating compressor comprising a stator and a rotor; during work, the stator and the rotor of the motor are immersed in the ammonia refrigerant; the winding, the slot wedge and the slot insulation are locked through self-lock fasteners, thereby preventing them from moving in the slot; the self-lock fasteners are fluorine plastic fasteners; the end portion of the motor winding is wound with a layer or multi-layers of fluorine plastic tape, and the outer layer of the fluorine plastic tape is provided with a binding tube; the binding tube is made from fluorine plastic, and the tensile strength of the binding tube is greater than that of the fluorine plastic tape.

4 Claims, 3 Drawing Sheets

(51) Int. Cl.
*H02K 3/44* (2006.01)
*H02K 3/487* (2006.01)
*H02K 3/34* (2006.01)
*H02K 11/25* (2016.01)
*H02K 3/38* (2006.01)
*F25B 49/02* (2006.01)
*H02K 3/30* (2006.01)

(52) U.S. Cl.
CPC ............... *H02K 3/345* (2013.01); *H02K 3/38* (2013.01); *H02K 3/44* (2013.01); *H02K 3/487* (2013.01); *H02K 11/25* (2016.01); *H02K 2203/06* (2013.01)

(58) Field of Classification Search
CPC .......... H02K 3/345; H02K 3/38; H02K 3/487; F25B 49/02; F25B 49/025
USPC ................................................ 310/45, 52–59
See application file for complete search history.

(56) References Cited

U.S. PATENT DOCUMENTS

| | | | |
|---|---|---|---|
| 6,345,963 B1 * | 2/2002 | Thomin | B64G 1/50 417/412 |
| 8,006,514 B2 * | 8/2011 | Tsuboi | F25B 31/004 62/468 |
| 2014/0210302 A1 * | 7/2014 | Vodak | H02K 3/44 310/214 |

* cited by examiner

AMMONIA-RESISTANT MOTOR USED FOR CLOSED-TYPE REFRIGERATING COMPRESSOR

TECHNICAL FIELD OF THE INVENTION

The present invention relates to the technical field of motors, and more particularly, to an ammonia-resistant motor used for a closed-type ammonia refrigerating compressor.

BACKGROUND OF THE INVENTION

Modern refrigeration technology has developed dramatically in the last century. At first, a traditional refrigerating system usually adopted an open-type refrigerating compressor, wherein the compressor and the power part (motor) are separated. In such a configuration, one end of the crankshaft is exposed outside of the compressor, and is connected to the motor through a coupling. The exposed portion of the crankshaft is provided with a shaft-sealing unit for preventing the refrigerant from leaking out.

The motor shell of the closed-type compressor and the compressor body are cast in one body and share an inner chamber. Thus, it's unnecessary to use a shaft-sealing unit so that the leakage problem can be solved. Furthermore, the motor winding can be cooled by utilizing the sucked low-pressure low-temperature refrigerant vapor, thereby greatly improving the cooling condition of the motor.

Today, closed-type compressors are widely applied to refrigerating equipment and air conditioners. As the motor and the closed-type compressor both work in the same sealed environment, the refrigerant must be in contact with the motor (namely, the working medium is not the air in common motors but the refrigerant). Thus, the motor must withstand the influence of the working medium therein.

In the prior art, the most commonly-used refrigerant adopted in closed-type compressors is Freon. However, Freon is environmentally harmful. Therefore, compared with other refrigerants, ammonia is an ideal refrigerant that possesses a higher refrigerating efficiency and is eco-friendly.

Basically, all the electrical materials (insulating materials and conductive materials) used in the Freon-resistant motor insulation system/structure are not ammonia-resistant. Additionally, Freon is a halo-hydrocarbon and has a high insulating performance. Thus, a small amount of moisture existing in the refrigerating system cannot affect the motor. However, when ammonia meets the moisture, an ionic-type conductive substance can be formed. Therefore, it's urgent for those skilled in the art to develop an ammonia-resistant motor capable of reliably working in the closed-type ammonia refrigerating compressor.

SUMMARY OF THE INVENTION

The purpose of the present invention is to solve the shortcomings in the prior art by providing an ammonia-resistant motor used for a closed-type ammonia refrigerating compressor.

To achieve the above purpose, the present invention adopts the following technical solution:

An ammonia-resistant motor used for a closed-type refrigerating compressor comprising a stator and a rotor; during work, the stator and the rotor of the motor are immersed in the ammonia refrigerant.

In another aspect of the present invention, the ammonia-resistant motor used for the closed-type refrigerating compressor comprises a winding lead wire, a phase insulation, a fluorine plastic tape, a fluorine plastic tape binding tube, a temperature sensor lead wire, a slot wedge, a slot insulation, a self-lock fastener, a winding lead wire wiring terminal and an interlayer insulation.

In another aspect of the present invention, the winding, the slot wedge and the slot insulation are locked through self-lock fasteners, thereby preventing them from moving in the slot. The self-lock fasteners are fluorine plastic fasteners.

In another aspect of the present invention, the end portion of the motor winding is wound with a layer or multi-layers of fluorine plastic tape, and the outer layer of the fluorine plastic tape is provided with a binding tube. The binding tube is made from fluorine plastic, and the tensile strength of the binding tube is greater than that of the fluorine plastic tape.

In another aspect of the present invention, the outer edge in the circumferential direction of the portion that extends out from the iron core and the slot insulation is wound by fluorine plastic tape for a certain number of windings, and the extension portion of the phase insulation at the intersecting position is reversely folded underneath the binding tube.

Compared with the prior art, the present invention has the following advantages:

First, the present invention solves the technical problem relating to the fixation of the slot wedge, the slot insulation and the winding; second, the present invention solves the technical problems relating to the mechanical fixation and protection of the end portion of the motor winding; third, the present invention solves the technical problem relating to the fixation of the phase insulation of the winding end portion during the manufacturing process.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

DETAILED DESCRIPTION OF THE INVENTION

Figure 1:
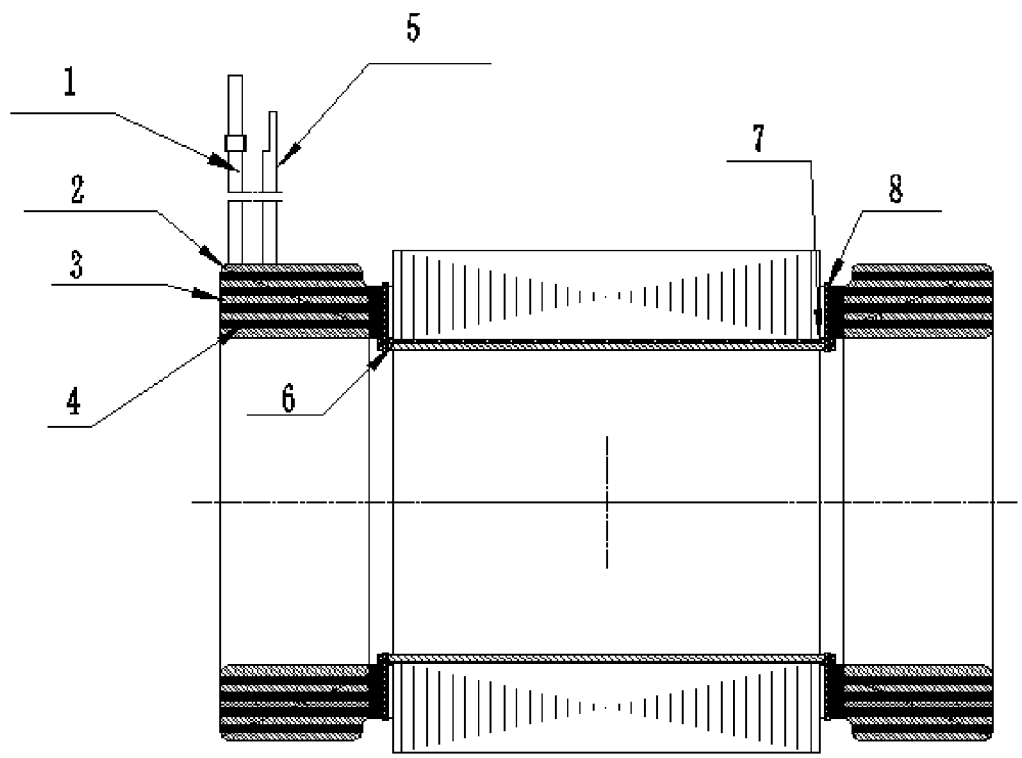
FIG. 1 is a schematic diagram of the ammonia-resistant motor used for the closed-type ammonia refrigerating compressor.
Figure 2:
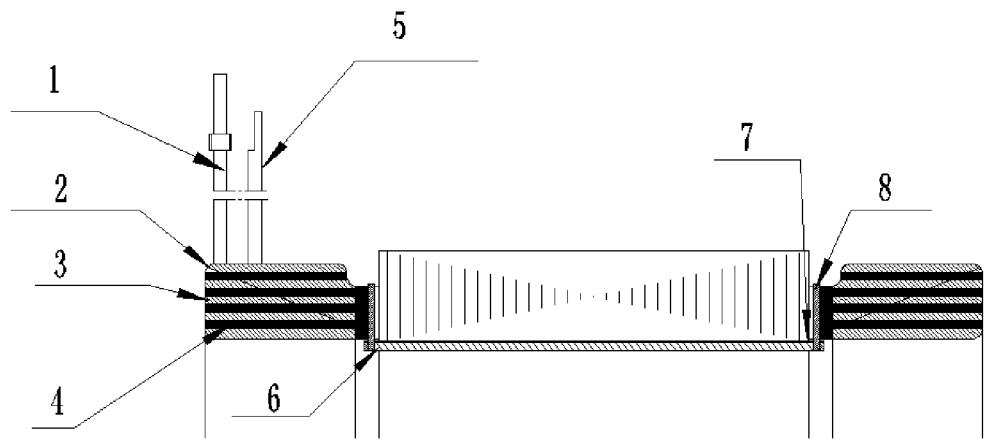
FIG. 2 is an enlarged view of a portion of the ammonia-resistant motor used for the closed-type ammonia refrigerating compressor.
Figure 3:
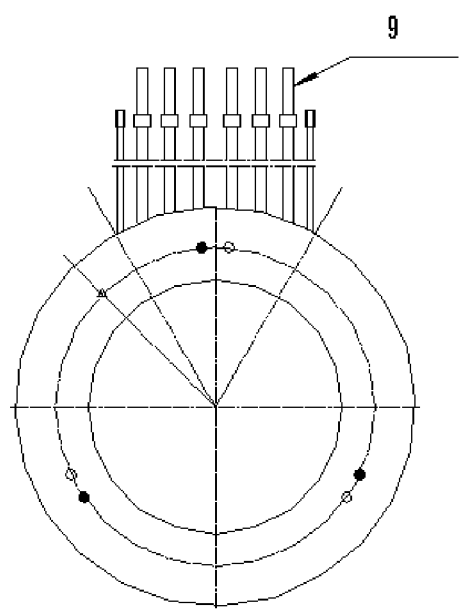
FIG. 3 is side view of the ammonia-resistant motor used for the closed-type ammonia refrigerating compressor.
Figure 4:
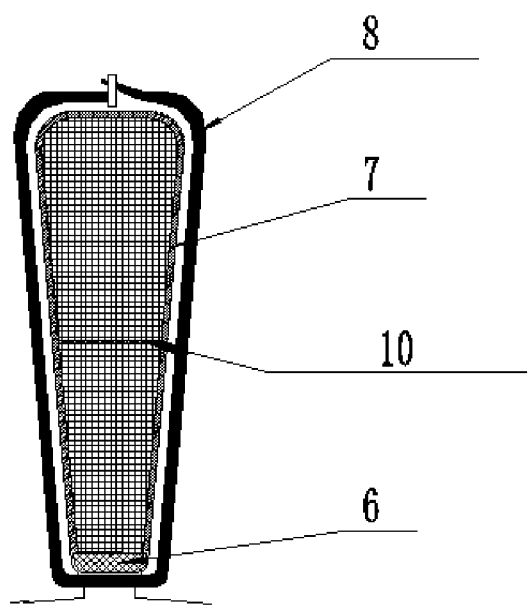
FIG. 4 is schematic diagram of the self-lock fixing slot wedge, the slot insulation and the winding.

Drawings and detailed embodiments are combined hereinafter to elaborate the technical principles of the present invention. The drawings are merely used for illustrative purposes, and cannot be understood as any limitation to the present invention. To better elaborate the exemplary embodiments of the present invention, some components may be omitted, magnified or reduced from the real size. The detailed descriptions of well-known functions and structures may be omitted to avoid the misunderstanding of the exemplary embodiments of the present invention.

An ammonia-resistant motor used for a closed-type ammonia refrigerating compressor comprises a winding lead wire 1, a phase insulation 2, a fluorine plastic tape 3, a fluorine plastic tape binding tube 4, a temperature sensor lead wire 5, a slot wedge 6, a slot insulation 7, a self-lock fastener 8, a winding lead wire wiring terminal 9 and an interlayer insulation 10.

During operation, the stator and the rotor of the motor are immersed in the ammonia refrigerant.

Compared with the prior art, the present invention has the following advantages:

First, the present invention solves the technical problem relating to the fixation of the slot wedge, the slot insulation and the winding.

The present invention's motor includes different insulating materials than traditional motors. Furthermore, due to the absence of impregnating varnish in the traditional process of manufacturing motors, the mechanical reinforcement effect that is brought to the end portion of the motor winding by the insulating treatment can be lost. Additionally, without being fixed by impregnating varnish, the slot wedge and the slot insulation can easily move in the slot, causing mechanical damage. Even worse, during the installation of the motor, the unfixed slot wedge can slide out from the slot, which might pose harm to the user during subsequent use.

Moreover, the traditional nylon fasteners sold on the market are poor in temperature resistance, ammonia resistance and aging resistance. Therefore, the present invention adopts fluorine plastic fasteners to lock the slot insulation, the slot wedge and the motor winding. The excellent self-lubricating performance of the fluorine plastic insulation electromagnetic wire can greatly reduce the damage to the electromagnetic wire that is caused by the attraction and repulsion between the electromagnetic vibration and the coil of the motor. The fluorine plastic fasteners adopted by the present invention can effectively fix the winding, the slot wedge and the slot insulation, thereby preventing them from moving in the slot.

Second, the present invention solves technical problems relating to the mechanical fixation and protection of the end portion of the motor winding.

The binding tape used at the end portion of the winding of the ammonia-resistant motor is made from fluorine plastic. Binding the end portion of the motor winding has the following advantages: first, protecting the motor winding from being mechanically damaged during the installation of the motor; second, protecting the end portion of the motor winding from being damaged by mechanical impurities (conductive or non-conductive particles) generated in the refrigerating system during the operation of the compressor; third, enhancing the mechanical strength of the end portion of the motor winding. Thus, when the end portion of the motor winding used for a closed-type refrigerating compressor is wound with a layer or multi-layers of fluorine plastic tape, the working reliability of the motor winding can be greatly improved.

During the operation of the compressor, when the fluorine plastic tape is damaged by mechanical impurities in the system, other moving parts can be twined by the broken fluorine plastic tape under the action of the running air flow of the refrigerant in the compressor channel, thereby causing other faults of the compressor or the motor. In order to solve the above problem, binding tubes are provided on the outer layer of the fluorine plastic tape. The binding tubes made from fluorine plastic have a high ammonia resistance. The processing art of the fluorine plastic tube determines its tensile strength. Thus, the fluorine plastic tape can be protected from being broken even if it is damaged to a certain degree. Moreover, the tensile capacity of the fluorine plastic tube is far greater than that of the fluorine plastic binding tape. When an external force is imposed on the fluorine plastic tape, most of the force can be absorbed by the fluorine plastic tube, thereby protecting the end portion of the motor winding from being damaged.

Third, the present invention solves the technical problem relating to the fixation of the phase insulation of the winding end portion during the manufacturing process.

Specifically, due to the voltage difference existing between the two phases of the winding, an excessively-high voltage can lead to the breakdown of the inter-phase. Therefore, a layer of phase insulation material must be provided to ensure that the insulation level between the two phases meets the standard.

For considering the fixation of the phase insulation, especially, the cross-fixation of the phase insulation at the root, the present invention adopts the following method to fix the phase insulation in the winding: continuously winding the outer edge in the circumferential direction of the portion that extends out from the iron core and the slot insulation (the portion where the winding just extends out from the slot insulation) by fluorine plastic tape; meanwhile, reversely folding the extension portion of the phase insulation at the intersecting position underneath the binding tube; subsequently, binding the end portion of the winding in the axial direction.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. An ammonia-resistant motor used for a closed-type refrigerating compressor, comprising: a stator, and a rotor, a winding lead wire, a phase insulation, a fluorine plastic tape, a fluorine plastic tape binding tube, a temperature sensor lead wire, a slot wedge, a slot insulation, a self-lock fastener, a winding lead wire wiring terminal and an interlayer insulation, wherein during operation, the stator and the rotor of the motor are immersed in the ammonia refrigerant.

2. The ammonia-resistant motor used for the closed-type refrigerating compressor of claim 1, wherein the winding, the slot wedge and the slot insulation are locked through self-lock fasteners, thereby preventing them from moving in the slot, wherein the self-lock fasteners are fluorine plastic fasteners.

3. The ammonia-resistant motor used for the closed-type refrigerating compressor of claim 2, wherein the end portion of the motor winding is wound with a layer or multi layers of fluorine plastic tape, and the outer layer of the fluorine plastic tape is provided with a binding tube, wherein the binding tube is made from fluorine plastic, and the tensile strength of the binding tube is greater than that of the fluorine plastic tape.

4. The ammonia-resistant motor used for the closed-type refrigerating compressor of claim 3, wherein the outer edge in the circumferential direction of the portion that extends out from the iron core and the slot insulation is wound by fluorine plastic tape for a certain number of windings, and the extension portion of the phase insulation at the intersecting position is reversely folded underneath the binding tube.

\* \* \* \* \*